Nov. 12, 1929.   R. W. JANDA   1,735,201
CLUTCH AND DRIVING MEANS
Filed Sept. 25, 1926   3 Sheets-Sheet 1
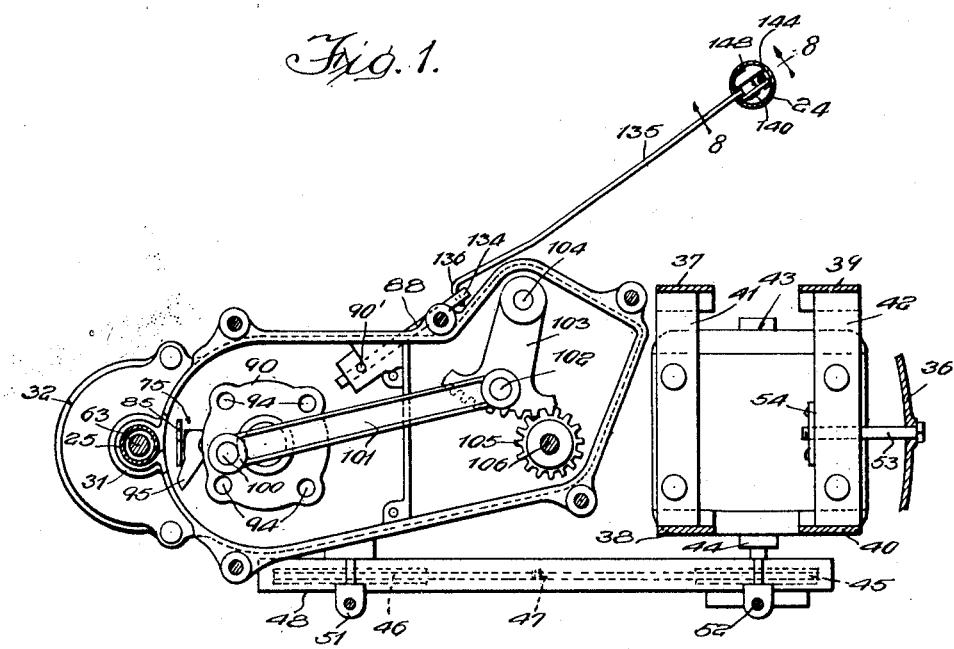

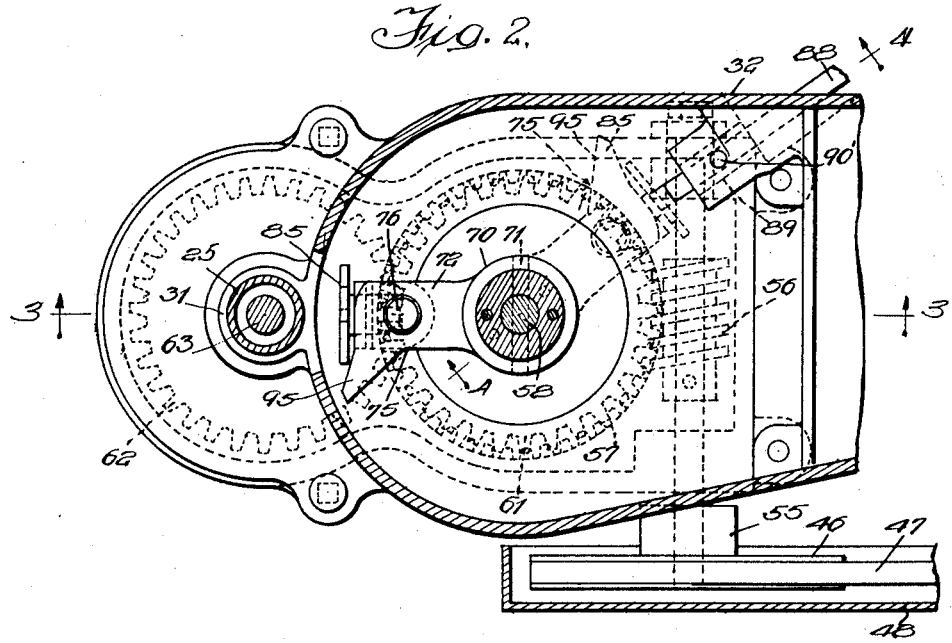

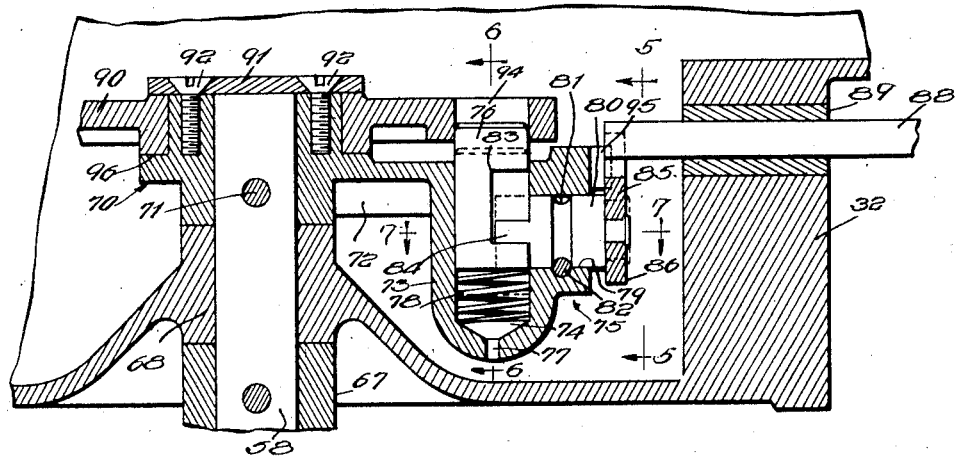
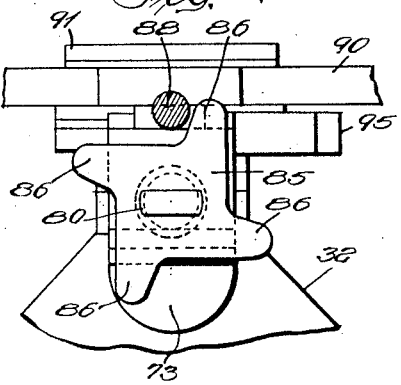
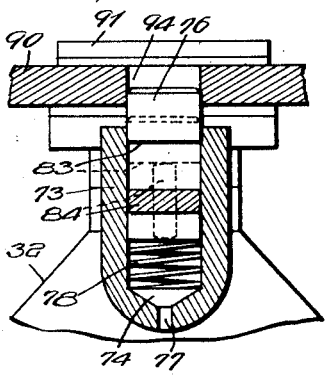
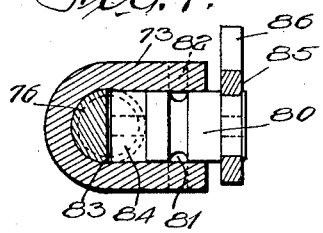

Patented Nov. 12, 1929

1,735,201

UNITED STATES PATENT OFFICE

RUDOLPH W. JANDA, OF BERWYN, ILLINOIS, ASSIGNOR TO CONLON CORPORATION, OF CICERO, ILLINOIS, A CORPORATION OF ILLINOIS

CLUTCH AND DRIVING MEANS

Application filed September 25, 1926. Serial No. 137,748.

My invention pertains in general to washing machines and more particularly to improvements in clutch and driving means I have made in a washing machine of the same general character as that disclosed in the copending patent application of Carl F. Anderson and Rudolph W. Janda, Serial No. 86,701, filed February 8, 1926.

I find from experience that there is a great demand for a washing machine, especially in households and the like, which can be controlled by a depressible push button or rod. To meet this demand, I propose to provide a washing machine having a novel clutch and associated driving mechanism adapted to be manually controlled through the means of a depressible push rod.

Other objects and advantages of my invention will more fully appear from the following detail description taken in connection with the accompanying drawings which illustrate one embodiment thereof and in which, Fig. 1 is a fragmentary plan view partly in section of a clutch and driving mechanism, and associated parts, constructed in accordance with my invention;

Fig. 2 is a fragmentary horizontal sectional view taken in a plane immediately beneath the loosely mounted clutch member, looking downwardly;

Fig. 3 is a sectional view taken on the line 3—3 of Fig. 2, looking upwardly;

Fig. 4 is a fragmentary sectional view taken on substantially the line 4—4 of Fig. 2, looking in the direction indicated by the arrows;

Fig. 5 is a fragmentary sectional view taken on the line 5—5 of Fig. 4, looking in the direction indicated by the arrows and illustrating the contour of the star shaped wheel of the clutch mechanism;

Fig. 6 is a sectional view taken on substantially the line 6—6 of Fig. 4, looking in the direction indicated by the arrows;

Fig. 7 is a sectional view taken on the line 7—7 of Fig. 4, looking downwardly;

Fig. 8 is a fragmentary sectional view taken on substantially the line 8—8 of Fig. 1, looking in the direction indicated by the arrows and illustrating the mechanism for connecting the button rod to the clutch operating rod; and Fig. 9 is a fragmentary sectional view taken on substantially the line 9—9 of Fig. 8, looking downwardly.

My clutch and driving mechanism is specially adapted for operating the agitator in a tank (not shown) of a washing machine. This tank is supported on a suitable frame or casting 17 from which depend legs 24, 25 and 26.

Each of the legs 24, 25 and 26 extends through a boss 30 fastened to the main casting 17. I preferably form these bosses 30 integral with the casting. The three bosses 30 are spaced equi-distantly about the periphery of the tank. The two legs 24 and 26 have their lowermost ends provided with casters. The tubular leg 25 terminates in a socket portion 31 of a gear housing 32 (Fig. 3). Fastened to the underside of the gear housing 32 is a gear casing 33 which has a lateral extension 34 provided with an opening or socket 35 for receiving the upper end of a leg 25'. The lower end of the leg 25' is equipped with a caster. It should also be noted that the leg 25' is disposed in alignment with the leg 25. The three legs 24, 26 and 25' serve to support the tank and the associated washing machine mechanism.

The casting 17 has a substantially annular flange 36 which extends downwardly therefrom. The casting is adapted to support the operating mechanism of the washing machine. Fastened to the under side of the casting or frame member 17 are four brackets 37, 38, 39 and 40 (Fig. 1). The brackets 37 and 38 carry a wooden member 41 and the brackets 39 and 40 carry a wooden member 42 disposed parallel to the member 41. The two support members 41 and 42 are adapted to carry a motor 43 suitably fastened thereto. The motor 43 is located intermediate the two legs 24 and 26. The motor shaft 44 has secured thereto a pulley 45 which drives a pulley 46 through a belt 47. The pulleys 45 and 46, as well as the belt 47, are enclosed in a suitable guard 48 fastened to the under side of the member 17. (Fig. 1.) A pair of brackets 51 and 52 serve to connect the belt guard 47 to the casting 17. The wooden support member 42 is connected to the adjoining portion of the flange 36 by means of a bolt 53 and a nut 54. Obviously by turning the bolt 53, the motor can be moved horizontally for the purpose of adjusting the tension on the belt 47 (Fig. 1).

Referring to Figs. 2 and 3, it will be observed that the wheel 46 is positioned adjacent the two casings 32 and 33. The wheel or pulley 46 is splined to a horizontal shaft 55 suitably journaled in the lowermost gear housing 33. This shaft 55 has connected to it, between its ends, an intermediate worm 56 located in the casing 33. The worm 56 meshes with a worm wheel 57 fastened to a vertical shaft 58. The vertical shaft 58 is journaled at 59 in an extension 60 formed integral with the lowermost casing 33. Mounted on the shaft 58 and secured thereto is a spur gear 61 which meshes with a spur gear 62. This spur gear 62 is positioned between the two legs 25 and 25′, preferably in axial alignment therewith.

A shaft 63 extends through the tubular leg 25 and has its lower end secured to the gear 62 by means of a pin 64 extending through the hub 65 of the spur gear 62. The upper end of the shaft is adapted to be connected to a wringer mechanism not shown.

Formed integral with the worm gear 57 is a hub portion 66 which abuts the portion 60 of the casing 33. Also formed integral with the spur gear 61 is a hub portion 67 which abuts the hub portion 66 of gear 57. The upper end of this hub 67 is disposed contiguous with a boss 68 formed integral with the casing 32. This arrangement provides adequate support for the vertical shaft 58 and prevents it from getting out of alignment.

Secured to the upper end of the vertical shaft 58 and positioned within the gear housing 32 is a clutch member 70. The member 70 is preferably fastened to the upper end of the shaft 58 by means of a pin 71 (Fig. 4). The member 70 has a laterally extending arm 72 which carries my novel clutch mechanism designated generally by the reference character 75. Extending downwardly from the arm 72 is a projection 73 formed integral therewith. This projection 73 has a cylindrical chamber 74 in which is disposed a plunger 76. The end of the projection 73 is provided with an oil aperture 77 by means of which oil may have access to the chamber. Located underneath the plunger 76 is a compression spring 78 adapted to at all times urge the plunger 76 upwardly.

Communicating with the chamber 74 is a horizontal opening 79 in which is disposed a circular rod 80 having an annular groove 81. The rod 80 is held in place in the extension 73 by means of a pin 82 extending through a portion of the groove. This pin 82 serves to retain the rod 80 in place but at the same time, it permits the rod 80 to turn. The plunger 76 has a rectangular recess 83 for receiving a reduced rectangular portion 84 formed integral with the rod 80. The rectangular portion 84 is approximately twice as wide as it is thick. When this portion 84 is in the position shown in Fig. 4, the plunger 76 will be urged outwardly by the spring 78. On the other hand, when this portion is in the dotted position shown in Fig. 4, the plunger 76 will be in its withdrawn position.

Fastened to the external end of the rod 80 is a star-like wheel 85 which has four projections 86. The projections 86 are adapted to engage the end of a rod 88, shown in Fig. 4. This rod 88 extends through a bushing 89 carried by the casing 32. The bushing 89 is held in place by means of a screw 90′, shown in Fig. 1.

Loosely mounted on top of the clutch member 70 is a clutch disc 90 which is held in place by means of a plate 91 fastened to the member 70 by screws 92. The disc 90 has a plurality of apertures 94 (Fig. 1) adapted to cooperate with the plunger 76. I preferably employ four of these apertures 94, but it is of course to be understood that I am not to be limited by this number since it would be possible to change the number of these apertures without deviating from the features of my invention.

It will be noted from Fig. 1 that the extension 73 of the clutch member 70 has a projection or arm 95 which arm, as will be more fully described hereinafter, serves to return the rod 88 to its initial position after an operation thereof. The extension 73 and the clutch member 70 rotate with the shaft 58. Also when the disc 90 is clutched to the member 70 by the plunger 76, the disc 90 will rotate with the shaft 58. The disc 90 (Fig. 4) is adapted to rest upon an annular shoulder 96 formed integral with the member 70.

In Figs. 1, 2 and 3, the clutch mechanism 75 is shown in full lines in its disengaged position. In Fig. 2, the clutch mechanism is illustrated in engaged position by the dotted lines. In Figs. 4, 5, 6 and 7, the plunger 76 is shown in full lines in engagement with one of the apertures 94 in the disc 90. The dotted line position indicates the disengaged position of the plunger in these figures.

It is evident from the foregoing that the gears are disposed in the casing 33 whereas the clutch mechanism is disposed in the upper housing 32. I shall now proceed to describe in detail the connection between the disc plate and the agitator shaft of the washing machine.

The clutch disc 90 (Fig. 1) has an eccentric pin 100 to which is pivotally attached one end of a link 101. The other end of the link 101 is pivotally attached to a pin 102 which is carried by a gear sector 103 pivoted upon a pin 104 connected to the gear housing.

The gear sector 103 meshes with a small pinion 105 secured to the agitator shaft 106 which extends into the tank of the machine. The pinion 105 is secured to the shaft 106 in any suitable or preferred manner. Associated with the shaft 106, to be driven thereby, is an agitator of suitable type (not shown).

Referring to Figs. 1, 8 and 9, I shall describe in detail the mechanism associated with the rod 88 for actuating the same. This rod 88 extends through a suitable aperture in the casing 32 outwardly towards the leg 24 of the tank. It will be observed that this rod 88 is disposed in substantially a horizontal position. The external end of the rod 88 is provided with an opening 134 (Fig. 1).

A bent end 136 of a wire rod 135 is connected to the external end of this rod 88 through the said aperture 134. The other end of the wire rod 135 extends into the hollow of the tubular leg 24 through an aperture 137 formed in the wall of the leg (Fig. 8). This end of the wire rod 135 is suitably fastened to a connecting element 140 positioned within the hollow of the leg. I preferably connect the rod 135 to this connecting element by providing the element with an aperture 141 and by bending the end of the rod 135 through this aperture as indicated at 142, Fig. 9. A button rod 144 extends downwardly through the tubular leg 24 and has its lower end fastened to the connecting element 140. I preferably form the lower end 144 into a lateral bend 146 and extend this bent portion 146 into an aperture 145 in the connecting element 140, as best shown in Fig. 9.

The upper extremity of the button rod 144 is provided with a button portion which extends above leg 24. This button is readily accessible to the housewife when she desires to connect or disconnect the agitator to the operating mechanism. Referring again to Figs. 8 and 9, it will be observed that the connecting element 140 is positioned in a recess 148 formed in a cylindrical block 150 tightly fitted in the leg 24. The element 140 is pivotally mounted upon a pin 151 secured to the cylindrical block 150 by means of a rivet 152 or the like. Also the block 150 is provided with a shoulder 153 upon which the lowermost portion of the element 140 is adapted to rest. It will be noted that I provide the element 140 with a curved portion 154 in order for it to easily clear the adjoining surfaces within the tube. A plunger 155 is adapted to engage this curved edge 154 to urge the connecting element 140 upwardly about the pivot pin 151. This plunger 155 is urged upwardly by a compression spring 156. Both the plunger and the spring are disposed in a suitable slot 157 formed in the block 150.

By depressing the button rod 144, the end of the rod 88 is projected into the path of the revolving star-wheel mechanism. This mechanism is set into motion by the drive between the motor 43 and the clutch mechanism. Any suitable means may be provided for setting the motor into motion. The projected end of the rod 88 engages one of the projections 86 of the star-wheel 85 causing the same to be revolved. This results in the pin 80 and its integral portion 84 being turned. Obviously, by turning the portion 84 (Fig. 4), the plunger 76 is released and is urged upwardly by the compression spring 78. The upper end of the plunger 76 engages in one of the apertures 94 in the clutch disc 90 connecting the disc to the revolving member 70. This results in the disc rotating with the vertical shaft 58. The revolving disc 90 through the means of the crank pin 100 and the link 101 imparts a reciprocatory motion to the gear sector 103 which actuates the vertical shaft 106 through the pinion 105. Thus it will be seen that the shaft 106 does not continuously rotate in one direction but rotates for approximately one-half a revolution in one direction and then for the next half revolution, rotates in the opposite direction.

After the star wheel 85 has been actuated by rod 88, arm 95, which trails the star wheel, contacts the inner end of the rod and returns it to retracted position. When it is desired to stop shaft 106, the rod 144 is again depressed projecting plunger rod 88 into the path of the star wheel 85, which is actuated by the rod to withdraw plunger 76 releasing the clutch disc 90. The rod 88 is then returned to retracted position, by arm 95, as before.

Should, for any reason, the belt 47 become slack, the slackness may be taken up by turning the bolt 53 in proper direction to move the motor bodily toward the flange 36 of the casting 17.

Now, I desire it understood that although I have illustrated and described in detail the preferred form of my invention, the invention is not to be thus limited, but only in so far as defined by the scope and spirit of the appended claims.

I claim:—

1. In combination, a drive shaft, a clutch member fastened thereto, a clutch plate loosely mounted on said shaft adjacent said member, said plate having a recess, a plunger carried by said member adapted to engage in said recess, means carried by the member for controlling the position of said plunger, said controlling means being unidirectional in its operation, and means for actuating the controlling means to cause the plunger to be moved into said recess and thus connect the clutch plate to said member, the plunger being withdrawn from the recess upon the succeeding actuation of the controlling means.

2. In combination, a drive shaft, a clutch member secured thereto, a clutch plate having a recess and loosely mounted on said shaft, a spring pressed plunger carried by the said member, a rotatable member operating in one direction for controlling the position of the plunger, said plunger being adapted to engage in the recess of the clutch plate, an extension connected to the rotatable member, and means movable into the path of said extension during the rotation of said member for actuating the plunger into and out of engagement with the clutch plate.

3. In combination, a drive shaft, a member fastened thereto, a clutch plate loosely mounted on the shaft and having a recess, a lateral extension formed integral with said member and having a pocket, a plunger mounted in the pocket and adapted to engage into the recess in said clutch plate, a rotatable member disposed at right angles to the plunger and operating in one direction for controlling the position of the plunger, a star wheel carried by the rotatable member, and means movable into and out of the path of the star wheel for controlling the position of the plunger.

4. In combination, a drive shaft, a clutch member fastened to the shaft, a clutch plate loosely mounted on the shaft adjacent said member, and said plate being provided with a plurality of apertures, a lateral extension connected to said member, said extension having a pair of cylindrical bores, disposed at right angles to each other, a plunger positioned in one of the bores and adapted to engage in one of the apertures in the plate, a revolvable pin positioned in the other bore connected to the said plunger for controlling the position thereof, said pin being unidirectional in its operation, and a star wheel connected to the pin and adapted to rotate the same to actuate the plunger.

5. In combination, a drive shaft, a clutch member fastened thereto, a clutch plate loosely mounted on the shaft adjacent said member, a lateral extension connected to said member, means carried by the extension for clutching the plate to the member, a projection associated with said means, a rod adapted to be projected into the path of said projection to actuate the clutch means to clutch the plate to the member, and means connected to said lateral extension for returning the rod to its initial position after each actuation thereof.

6. In combination, a drive shaft, a clutch member connected thereto, a clutch plate loosely mounted on the shaft adjacent said member, a lateral extension connected to the member and having a pair of bores disposed at right angles to each other, said plate having a plurality of apertures, a plunger positioned in one of the bores and adapted to engage in one of the apertures in the plate to clutch the plate to the member, resilient means for at all times urging the plunger towards the plate, said plunger having a recessed portion communicating with the other bore, a revolvable element positioned in the other bore and having a projection extending into the recessed portion of the plunger, and means for turning said element to release the plunger and permit it to be urged into engagement with the plate.

7. In combination, a drive shaft, a clutch member connected thereto, a clutch plate loosely mounted on the shaft adjacent said member, a lateral extension connected to said member and having a pair of bores disposed at right angles to each other, said plate having a plurality of apertures, a plunger positioned in one of the bores and adapted to engage in one of the apertures in the plate to clutch the plate to the member, resilient means for at all times urging the plunger toward the plate, said plunger having a recessed portion communicating with the other bore, a revolvable element positioned in said other bore and having a projection extending into the recessed portion of the plunger, a star wheel connected to the revolvable element externally of the extension, and means movable into the path of the star wheel to turn the same and permit the plunger to be moved into engagement with the plate.

8. In combination, a drive shaft, a member secured to the shaft for rotation therewith, a second member loose on the shaft, means for clutching said members together, means carried by the first member for controlling the clutch means, said control means being unidirectional in its operation, a multi-armed member carried by the control means for actuating the same, an abutment member movable into and out of the path of travel of said multi-armed member, and means carried by said first member for returning the abutment member to inoperative position after an actuation of the clutch control means.

In witness whereof, I hereunto subscribe my name this 21 day of September, 1926.

RUDOLPH W. JANDA.